(12) United States Patent
Buckris

(10) Patent No.: US 12,197,548 B2
(45) Date of Patent: Jan. 14, 2025

(54) SYSTEM AND METHOD FOR DEVICE-SPECIFIC CRYPTOGRAPHIC KEY

(71) Applicant: Ruben Buckris, Brooklyn, NY (US)

(72) Inventor: Ruben Buckris, Brooklyn, NY (US)

( * ) Notice: Subject to any disclaimer, the term of this patent is extended or adjusted under 35 U.S.C. 154(b) by 251 days.

(21) Appl. No.: 18/060,547

(22) Filed: Nov. 30, 2022

(65) Prior Publication Data

US 2024/0176854 A1 May 30, 2024

(51) Int. Cl.
*G06F 21/12* (2013.01)
*G06F 21/10* (2013.01)
*H04L 9/32* (2006.01)

(52) U.S. Cl.
CPC .......... *G06F 21/121* (2013.01); *H04L 9/3231* (2013.01); *G06F 21/1015* (2023.08)

(58) Field of Classification Search
CPC ........ G06F 21/12; G06F 21/10; G06F 21/121; G06F 21/1015; H04L 9/32; H04L 9/3231
See application file for complete search history.

(56) References Cited

U.S. PATENT DOCUMENTS

| | | | |
|---|---|---|---|
| 8,914,908 B2* | 12/2014 | Katkar | G06F 21/10 713/193 |
| 11,263,848 B2* | 3/2022 | Suleiman | H04L 63/108 |
| 2014/0282897 A1* | 9/2014 | Stuntebeck | G06F 21/6218 726/4 |
| 2018/0144109 A1* | 5/2018 | Kamakura | G06F 21/121 |
| 2020/0136827 A1* | 4/2020 | Hopkins | H04L 9/3231 |

FOREIGN PATENT DOCUMENTS

CN 107241317 B * 1/2021 ......... H04L 63/0861

* cited by examiner

*Primary Examiner* — Jayesh M Jhaveri

(57) ABSTRACT

A system and method for securely obtaining access to a program operating on a remote device via a local smart pass program transmitting a local cryptographic key specific to a local user device.

19 Claims, 13 Drawing Sheets

SYSTEM AND METHOD FOR DEVICE-SPECIFIC CRYPTOGRAPHIC KEY

SUMMARY

The system may comprise a computing device, such as a smart phone, tablet, laptop, or desktop computer, a primary program, such as a software application, a browser, a website, and/or an online platform, a network, an external processor, and a cryptographic key program. In one embodiment, the computing device is configured to access the program over a network, with the primary program configured to receive data and instructions from the external processor. In another embodiment, the primary program is stored, installed, and run on the computing device, and the program is configured to send and receive data between the computing device and the external processor via the network. In yet another embodiment, the primary program is configured to be stored, installed, and run on the external processor, but is configured to send and receive data between the external processor and the computing device via the network. In all of these embodiments, the cryptographic key program is stored, installed, and run on the computing device.

In one embodiment, the cryptographic key is configured to enable a user to access a plurality of primary programs via a computing device on which the cryptographic key is stored, installed, and run. In another embodiment, a separate cryptographic key is dedicated to each separate primary program. Thus, a local cryptographic key is dedicated to a first primary program, a remote cryptographic key is dedicated to a second primary program, etc.

The cryptographic key may be configured to recognize the device on which it is initially stored and installed. The cryptographic key is configured to run, and only run, on this same device and no other devices. Recognition of the device and distinguishing that device from all other devices may occur by detecting, remembering, and verifying a plurality of factors. Those factors may include and be a combination of: a user account associated with the device, a phone number associated with the device, a SIM card associated with the device, a WiFi network or Bluetooth connection, the time at which the primary program was downloaded or modified in a particular way, the time at which the cryptographic key (or cryptographic keychain, as will be described) was created, the operating system of the device, a unique unit code associated with the device to distinguish it from other units of the device, various types of data stored on the device, and an encrypted dataset created by or forming the cryptographic key and installed on the device.

The encrypted dataset may be or may be a combination of a symmetric keys, private and public keys, cryptographic hash functions, cryptographic algorithms, cryptographic systems, lightweight cryptographics, user-created passwords, randomly created passwords, encoded information, plaintext, cyphertext, random codes, pseudo-random codes, Caesar cipher codes, or any other password or encryption/cryptography created/enabled code. The encrypted dataset may exist solely or partially on the computing device, in the cryptographic key, in the cryptographic keychain (as will be described), in the primary program, on the external processor, on a dedicated processor, in the cloud, etc. The encrypted dataset may include encrypted sub-datasets created or stored in any of the aforementioned cases, such that a combination of the encrypted sub-datasets are required in order to form the full encrypted dataset.

The encrypted dataset may be an algorithm configured to receive visual data, such as that derived via a camera, or biological data, such as DNA or blood. Visual data obtained via a camera may include visual data depicting an instantaneous capture of a human iris, a face, a thumbprint, etc. The algorithm may be configured to determine whether the instantaneous capture matches a corresponding previously obtained dataset of a similar type, thereafter encrypted. The algorithm may be a set of algorithms, an expert system, and/or a neural network. The algorithm may comprise a hash function, which creates a hash value from encrypting and compressing various datasets relating to the system and/or random numbers.

In one embodiment, a cryptographic keychain is stored and installed on the device. The cryptographic keychain is configured to store and provide some level of viewing and activation access of the various cryptographic keys that are stored and installed on the device. The cryptographic keychain may be configured to align various attributes of the cryptographic keys as additional cryptographic keys are created, saved, installed, and run on the device. The cryptographic keychain may be referred to as a "smart pass wallet" and the individual cryptographic keys may be referred to as "smart passes". For convenience, the smart pass wallet may also be referred to as a "smart pass".

In one embodiment, when a user requests to access the primary program, the primary program will send a verification request to the smart pass. If the smart pass verifies the user and device, then the user is able to access the primary program via the device. Verification by the smart pass may be incumbent on the smart pass a. confirming the device via the encryption dataset, and b. receiving an input of a user identification input, and c. confirming the user identification input matches or is sufficiently similar to a previously confirmed user identification input. The user identification input may be a code or password entered by the user via an input means, such as a keyboard, mouse, or touch screen, or the presentation to a camera or other visual detection component of an eye, face, fingerprint, or similar identifying body part or secret/secure physical object, or even a blood sample to a needle or other pinprick device.

In one embodiment, when a user wishes to access the primary program, the user will select and run the smart pass prior to or immediately after requesting access to the primary program. The selection and running of the smart pass may occur via a user interface of the device, or via a physical dedicated smart pass button disposed on the device. In one embodiment, the user opens and runs the smart pass wallet, and then indicates which smart pass to actuate. Thus, the user is able to arrange for the verification only for the primary program to which the smart pass is dedicated without having to first access and request verification via the particular primary program.

DETAILED DESCRIPTION

Figure 1:
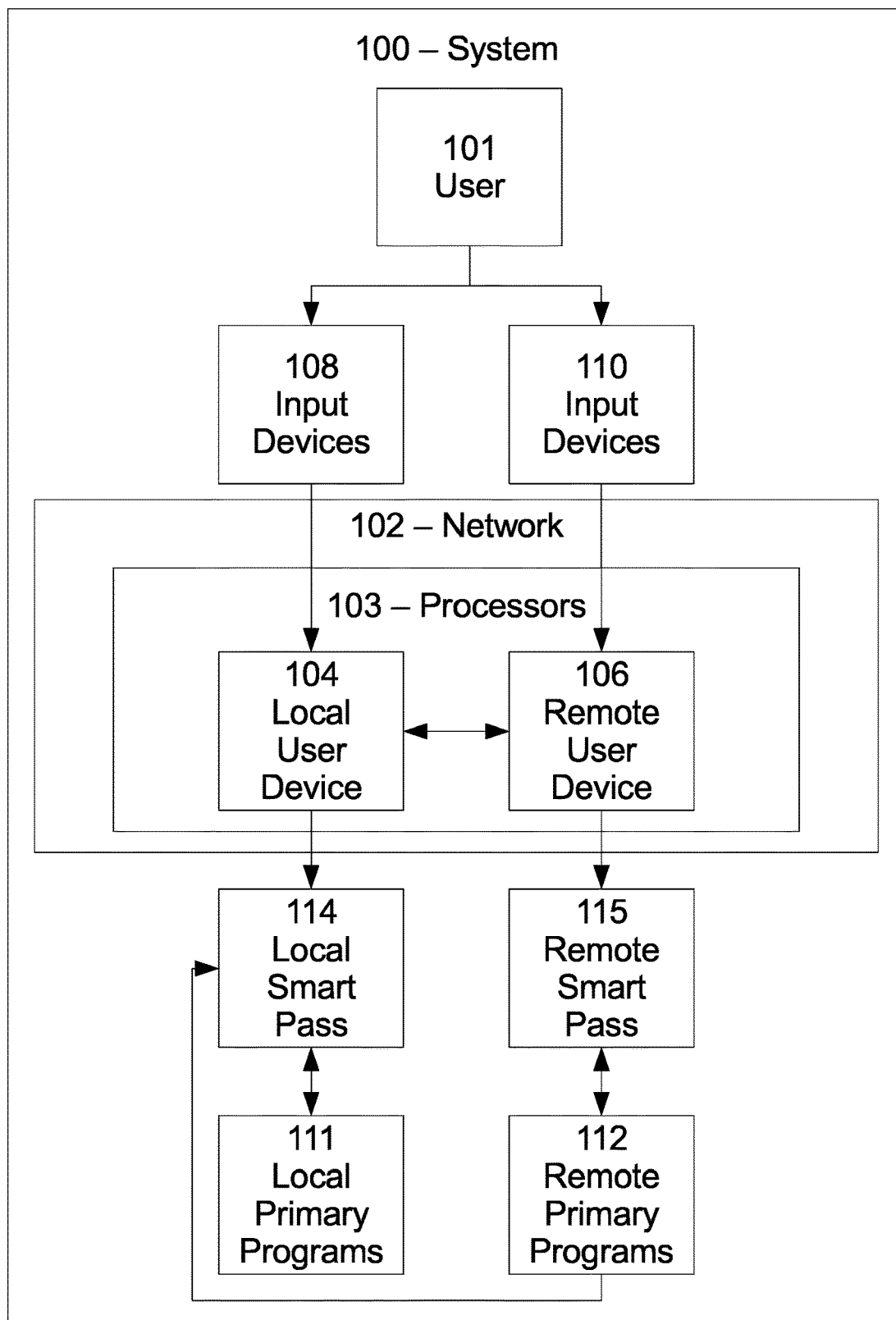
FIG. 1 shows an exemplary system.

FIG. 1 shows an exemplary system 100 comprising a set of processors or devices comprising processors 103 configured to operate over a network 102, a first ("local") user device 104, a second ("remote") user device 106, a set of input devices 108, 110, a first ("local") set of primary programs 111, a second ("remote") set of primary programs 112, a first ("local") smart pass program 114, a second ("remote") smart pass program 116, and a user 101. In normal usage, only the user operates the local and remote user devices. The local smart pass program is installed on and operates on the local user device and the remote smart pass program is installed on and operates on the remote user device. The local smart pass program may be configured to create and store a plurality of local cryptographic keys on the local user device and the remote smart pass program may be configured to create and store a plurality of "remote" cryptographic keys on the remote user device. The terms "local" and "remote" are use, first, when there is a plurality of user devices, and one of the user devices is treated by the system as closer to the user, and therefore more secure. However, the designation of which user device is the more secure of a set may changed based on context. For example, the first user device engaged by the user or the primary program may be considered "remote" in that the second user device, as a backup, provides greater security to the process of accessing the primary program. If a party other than the user is attempting to access a remote primary program without access to the local user device, then the system will prevent access to the remote primary program.

Each primary program may be a software application, a browser, a website, an online platform, or a combination thereof. The smart pass programs may be installed on user devices and configured to communicate with each other as well as primary programs.

Figure 2:
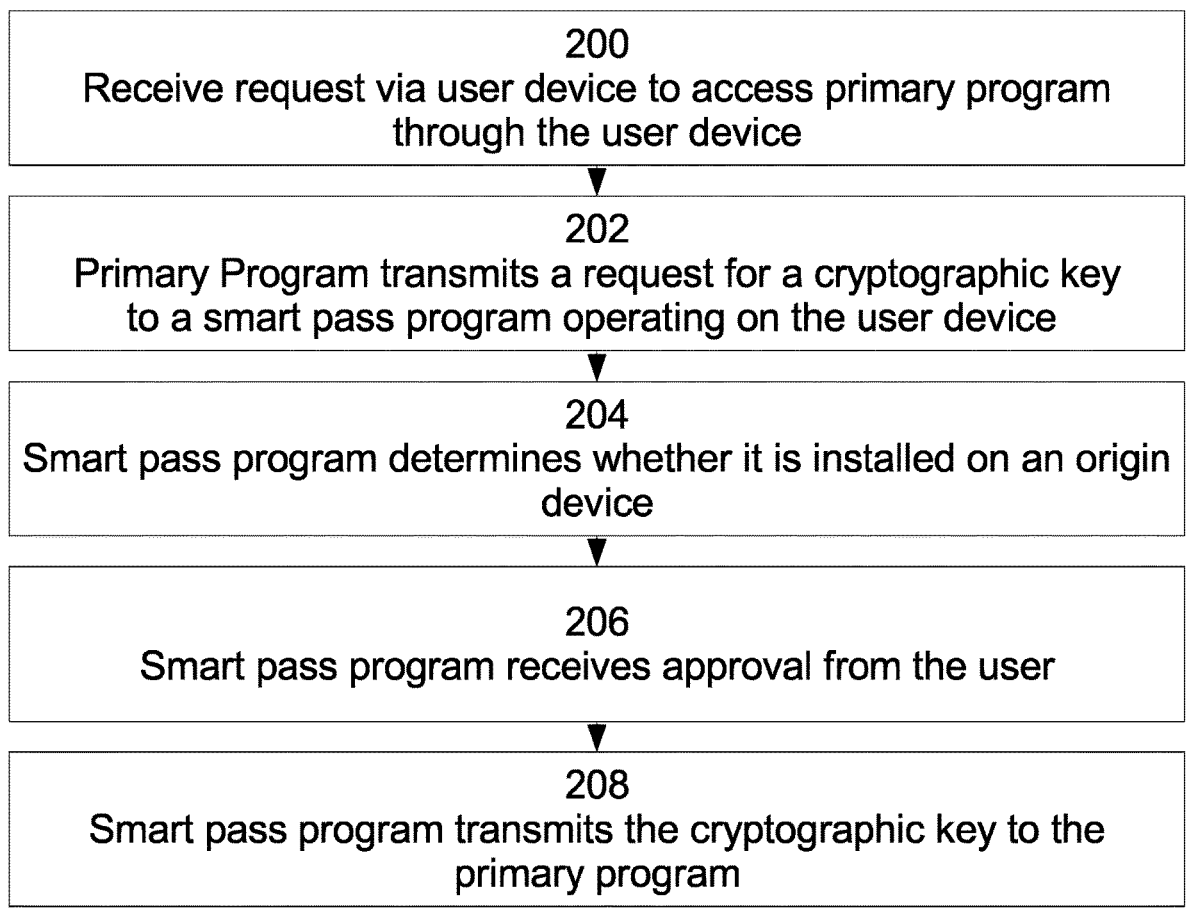
FIG. 2 is a flowchart showing an exemplary system process for securely obtaining access to a primary program by requesting access from the primary program.

FIG. 2 shows an exemplary system process. Upon receiving a request via a user device from a user to access a primary program through the user device 200, the primary program may transmit a request to a smart pass program operating on the user device for a dedicated cryptographic key 202. The smart pass program may first determine whether it is installed on an origin device 204, which is the device on which the smart pass program was initially installed, and upon receiving approval from the user 206, transmit the cryptographic key to the primary program 208. In this process, since the user is requesting access directly of the primary program, the smart pass program may need the user's permission to transmit the cryptographic key.

Figure 3:
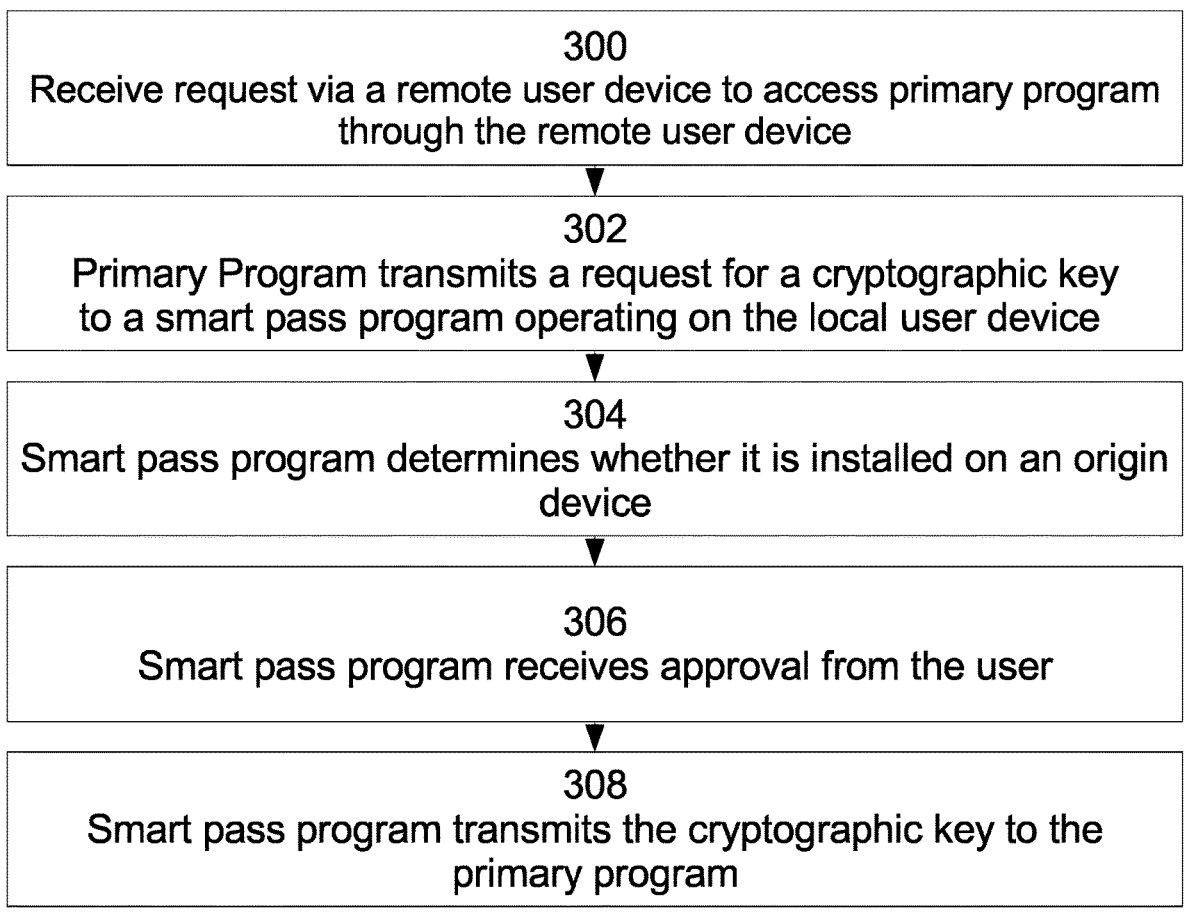
FIG. 3 is a flowchart showing an exemplary system process for securely obtaining access to a primary program on a remote device by requesting access from the primary program.

FIG. 3 shows an exemplary system process. Upon receiving a request via a remote user device from a user to access a primary program through the remote user device 300, the primary program may transmit a request to a smart pass program operating on a local user device for a dedicated cryptographic key 302. The smart pass program may first determine whether it is installed on an origin device 304, which is the device on which the smart pass program was initially installed, and upon receiving approval from the user 306, transmit the cryptographic key to the primary program 308. In this process, since the user is requesting access via a remote user device on which the smart pass program is not operating, the smart pass program may need the user's permission to transmit the cryptographic key.

Figure 4:
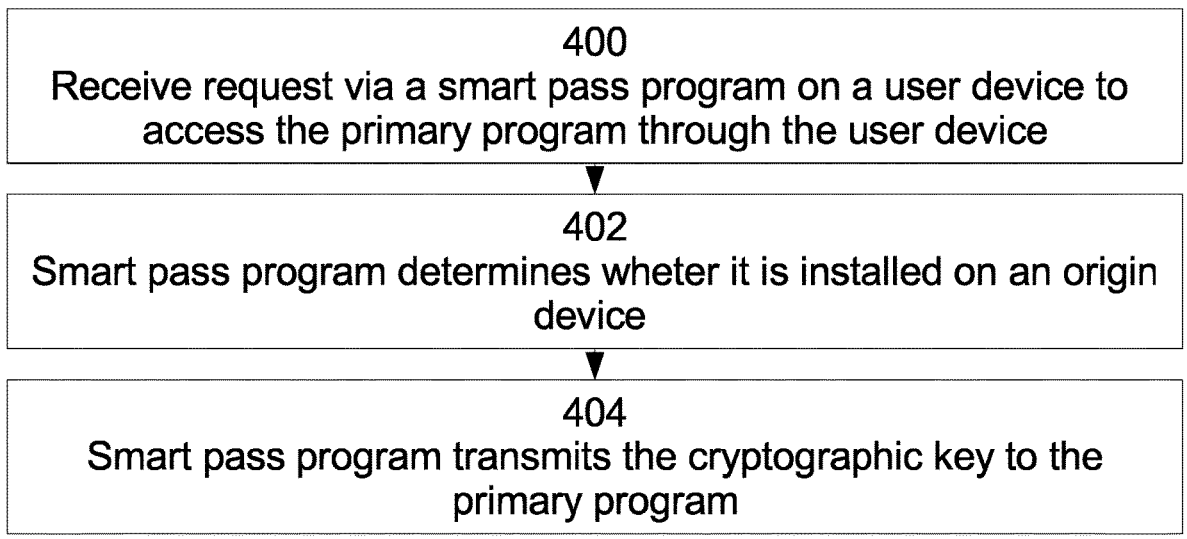
FIG. 4 is a flowchart showing an exemplary system process for securely obtaining access to a primary program by requesting access from a smart pass program.

FIG. 4 shows an exemplary system process. Upon receiving a request via a smart pass program on a user device from a user to access a primary program through the user device 400, a smart pass program may determine whether it is installed on an origin device 402, and if so, transmit to the primary program a cryptographic key dedicated to that primary program 404. In this process, since the user is requesting access to the primary program via the smart pass program, the smart pass program does not need additional permission from the user to transmit the cryptographic key to the primary program.

Figure 5:
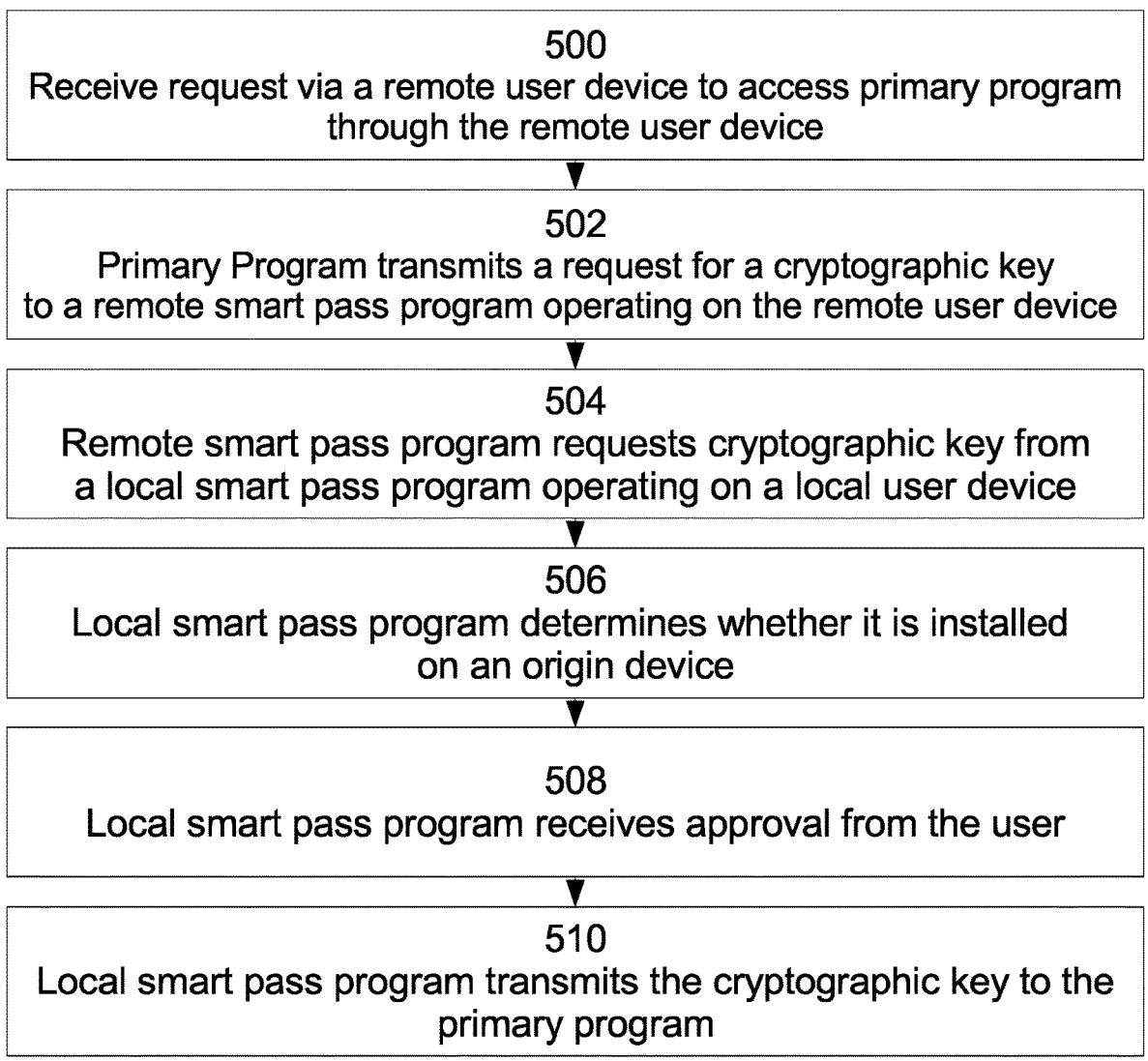
FIG. 5 is a flowchart showing an exemplary system process for securely obtaining access to a primary program on a remote device by requesting access from the primary program, with access secured via a local smart pass program and a remote smart pass program.

FIG. 5 shows an exemplary system process. Upon receiving a request via a remote user device, such as a computer, to access a primary program through the remote user device 500, the primary program may request a cryptographic key from a remote smart pass program operating on the remote user device 502. The remote smart pass program may then request the cryptographic key from a local smart pass program, operating on a local user device, such as a phone

504. The local smart pass program may first determine whether it is installed on an origin device 506, and upon receiving approval from the user 508, transmit to the primary program a cryptographic key dedicated to that primary program 510. In this process, since the user is a. requesting access directly of the primary program and b. via the remote user device, the local smart pass program may need the user's permission to transmit the cryptographic key.

Figure 6:
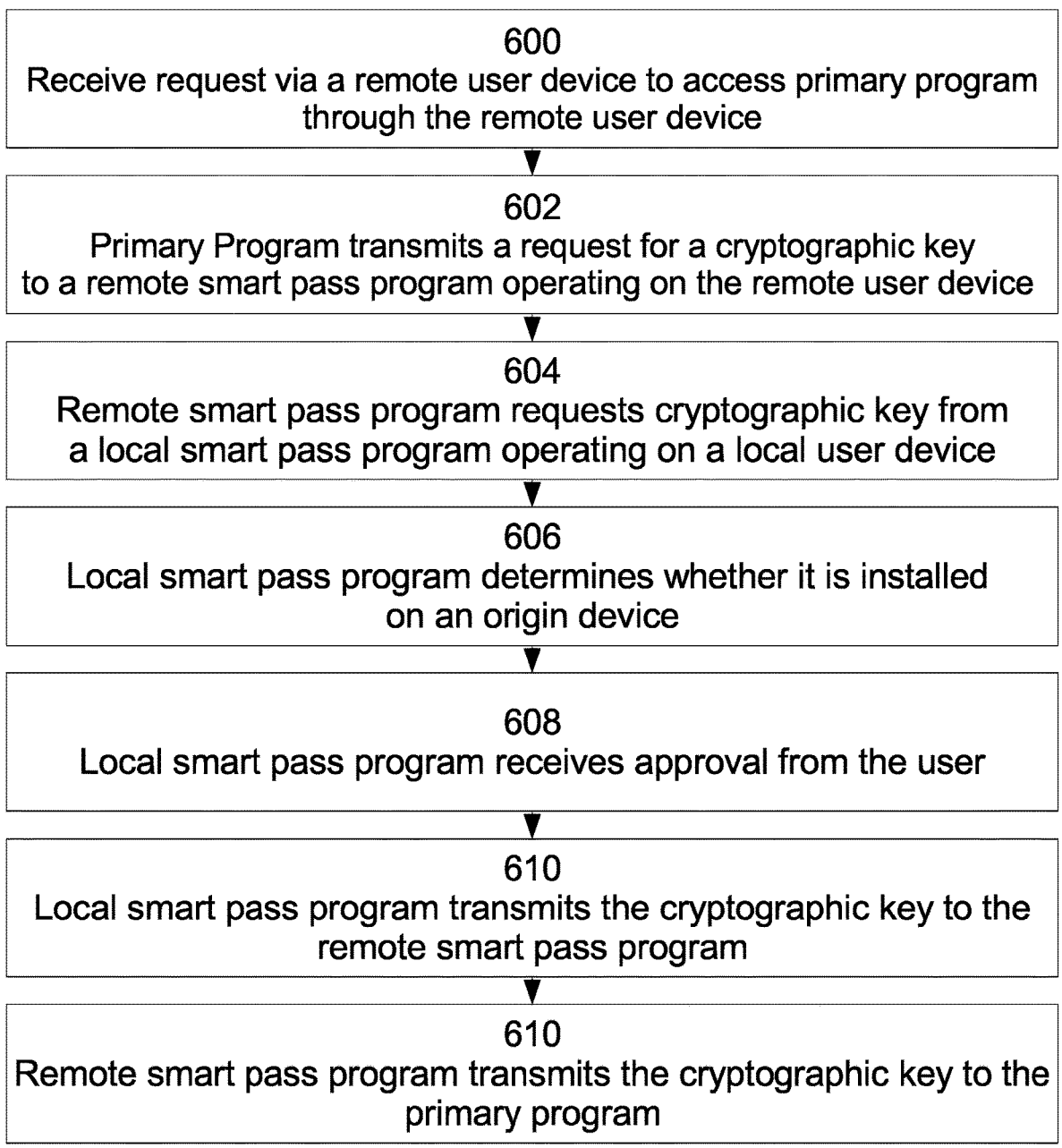
FIG. 6 is a flowchart showing an exemplary system process for securely obtaining access to a primary program on a remote device by requesting access from the primary program, with access secured via a local smart pass program and a remote smart pass program.

FIG. 6 shows an exemplary system process. Upon receiving a request via a remote user device to access a primary program through a remote user device 600, the primary program may request a cryptographic key from a remote smart pass program operating on the remote user device 602. The remote smart pass program may then request the cryptographic key from a local smart pass program, operating on a local user device, such as a phone 604. The local smart pass program may first determine whether it is installed on an origin device 606, and upon receiving approval from the user 608, transmit to the remote smart pass program a cryptographic key dedicated to that primary program 610. The remote smart pass program may then transmit the cryptographic key to the primary program 612. As in the process described by FIG. 5, since the user is a. requesting access directly of the primary program and b. via the remote user device, the local smart pass program may need the user's permission to transmit the cryptographic key to the remote smart pass program. However, the remote smart pass program does not need additional permission from the user to transmit the cryptographic key received by the local smart pass program to the primary program.

Figure 7:
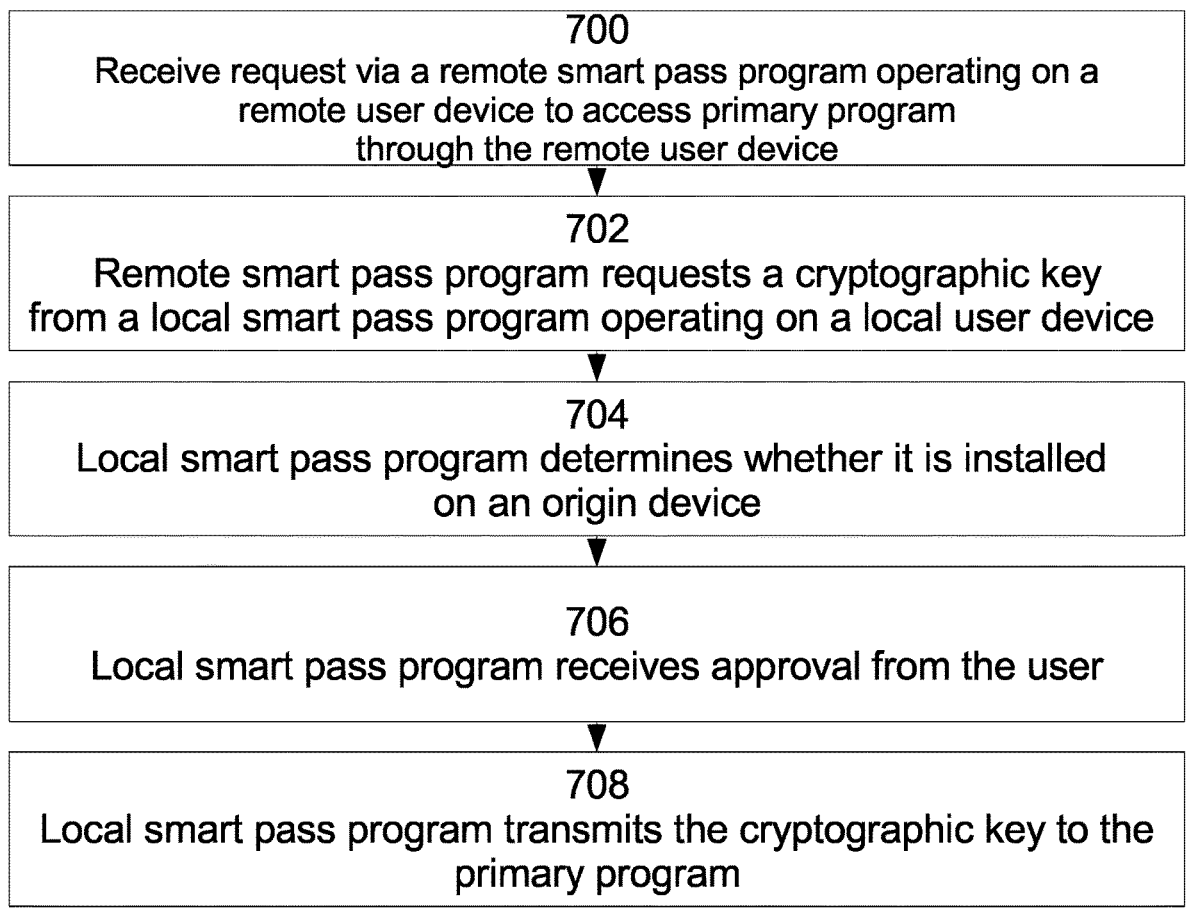
FIG. 7 is a flowchart showing an exemplary system process for securely obtaining access to a primary program on a remote device by requesting access from a remote smart pass program, with access secured via a local smart pass program.

FIG. 7 shows an exemplary system process. Upon receiving a request via a remote smart pass program operating on a remote user device to access a primary program through the remote user device 700, the remote smart pass program may request a cryptographic key from a local smart pass program, operating on a local user device, such as a phone 702. The local smart pass program may first determine whether it is installed on an origin device 704, and upon receiving approval from the user 706, transmit to the primary program a cryptographic key dedicated to that primary program 708.

Figure 8:
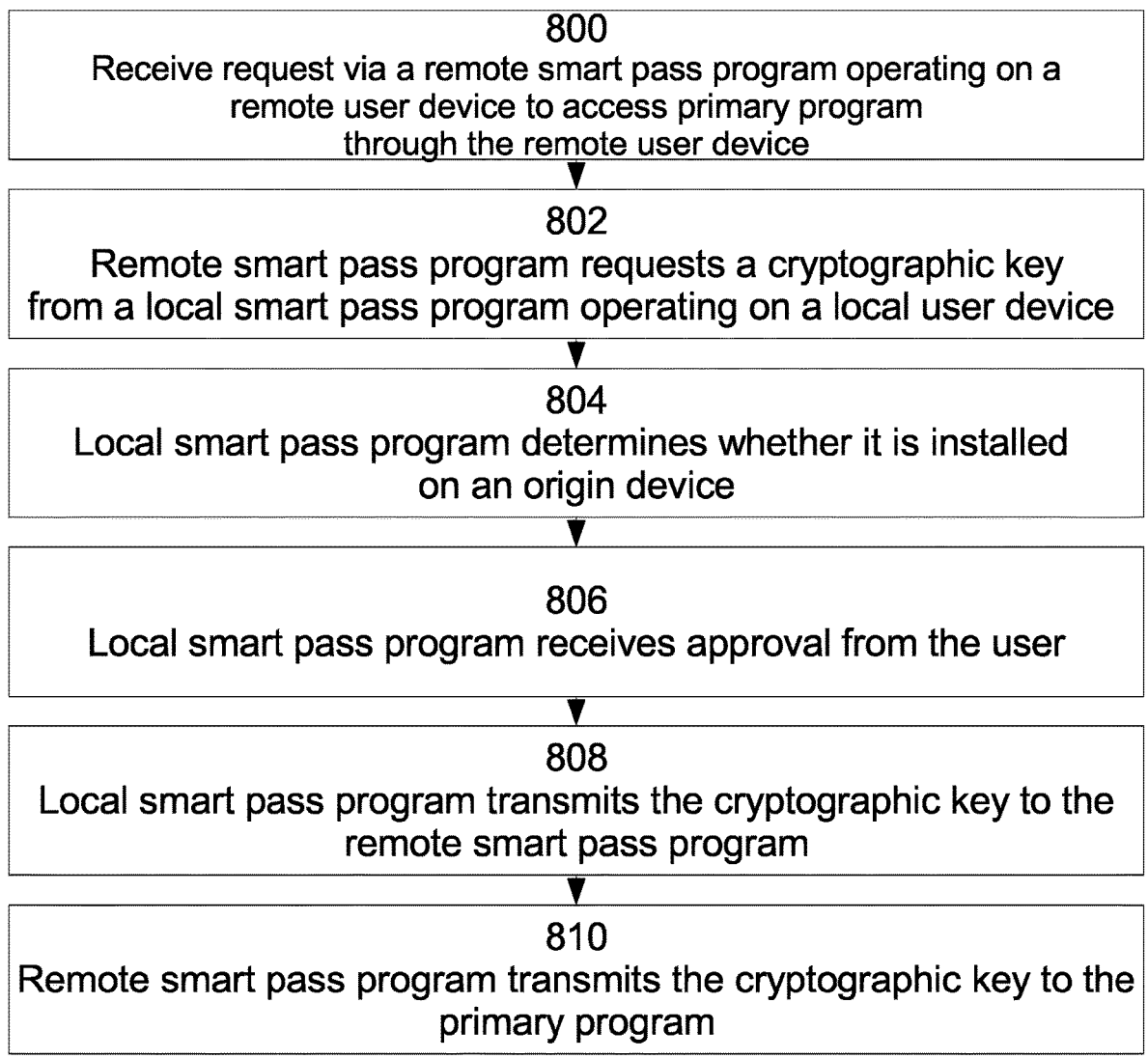
FIG. 8 is a flowchart showing an exemplary system process for securely obtaining access to a primary program on a remote device by requesting access from a remote smart pass program, with access secured via a local smart pass program and a remote smart pass program.

FIG. 8 shows an exemplary system process. Upon receiving a request via a remote user device to access a primary program through the remote user device 800, the remote smart pass program may request a cryptographic key from a local smart pass program, operating on a local user device, such as a phone 802. The local smart pass program may first determine whether it is installed on an origin device 804, and upon receiving approval from the user 706, transmit to the remote smart pass program a cryptographic key dedicated to that primary program 708. Then the remote smart pass program may then transmit the cryptographic key to the primary program 710.

Figure 9:
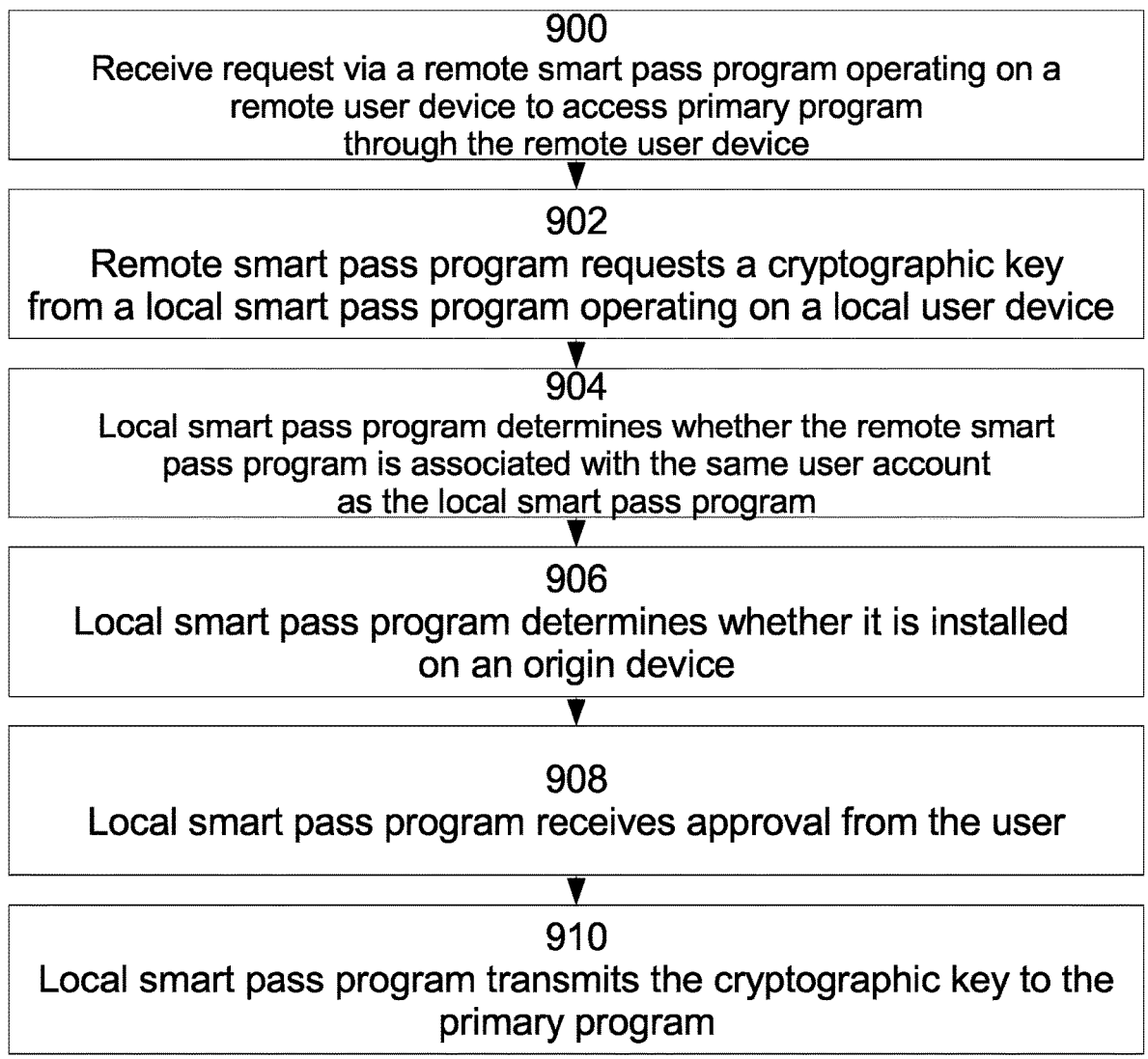
FIG. 9 is a flowchart showing an exemplary system process for securely obtaining access to a primary program on a remote device by requesting access from a remote smart pass program, with access secured via a local smart pass program and a remote smart pass program.

FIG. 9 shows an exemplary system process. Upon receiving a request via a remote smart pass program operating on a remote user device to access a primary program through the remote user device 900, the remote smart pass program may request a cryptographic key from a local smart pass program, operating on a local user device, such as a phone 902. The local smart pass program may first determine whether the remote smart pass program is associated with the same user as the local smart pass program 904, then determine whether it is installed on an origin device 906, and upon receiving approval from the user 908, transmit to the primary program a cryptographic key dedicated to that primary program 910.

Figure 10:
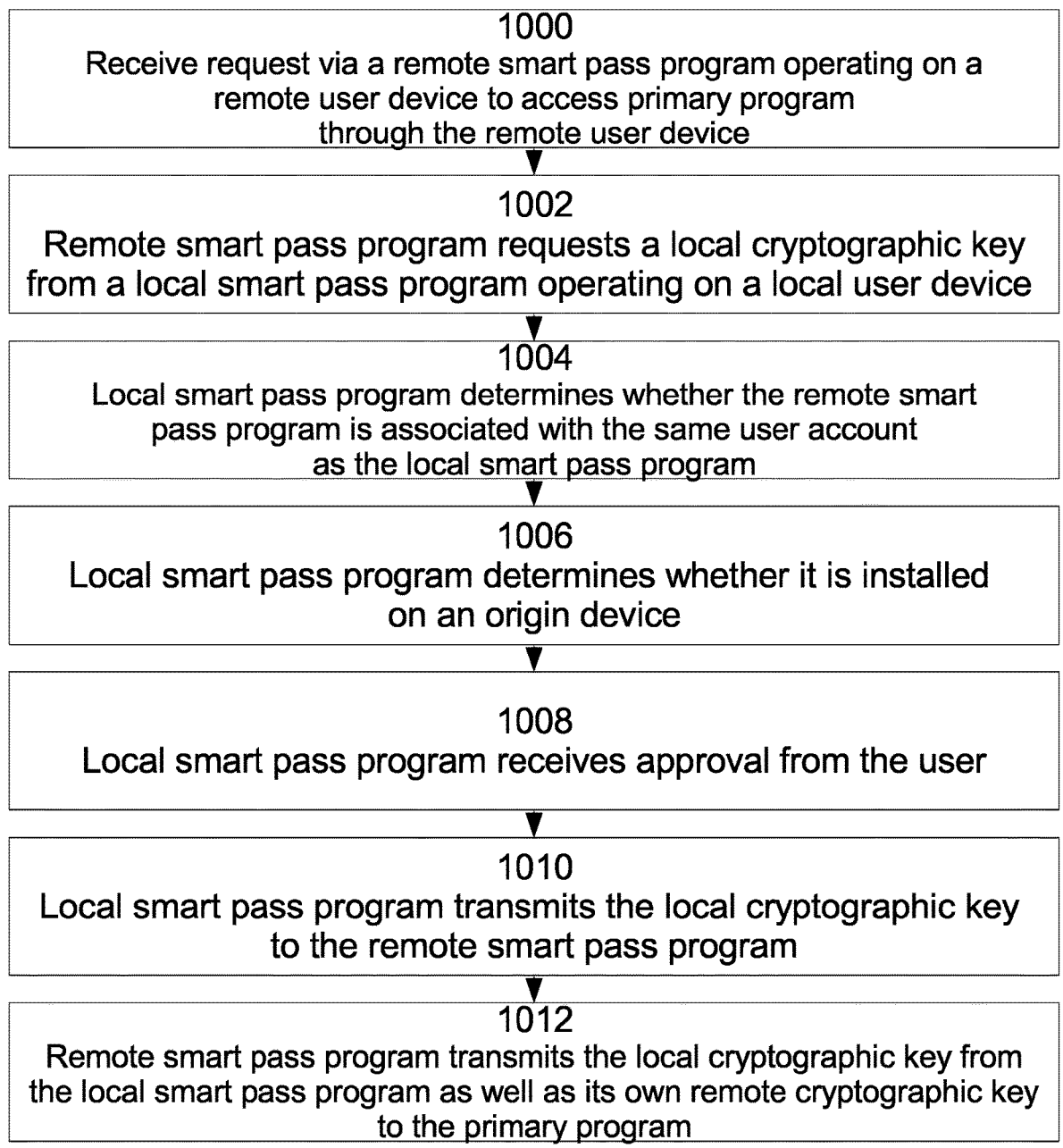
FIG. 10 is a flowchart showing an exemplary system process for securely obtaining access to a primary program on a remote device by requesting access from a remote smart pass program, with access secured via a local smart pass program transmitting a local key and a remote smart pass program transmitting a remote key.

FIG. 10 shows an exemplary system process. Upon receiving a request via a remote smart pass program operating on a remote user device to access a primary program through the remote user device 1000, the remote smart pass program may request a cryptographic key from a local smart pass program, operating on a local user device, such as a phone 1002. The local smart pass program may first determine whether the remote smart pass program is associated with the same user as the local smart pass program 1004, then determine whether it is installed on an origin device 1006, and upon receiving approval from the user 1008, transmit to the remote smart pass program a cryptographic key dedicated to that primary program 1010. Then the remote smart pass program may then transmit the cryptographic key from the local smart pass program as well as its own cryptographic key to the primary program 1012.

Figure 11:
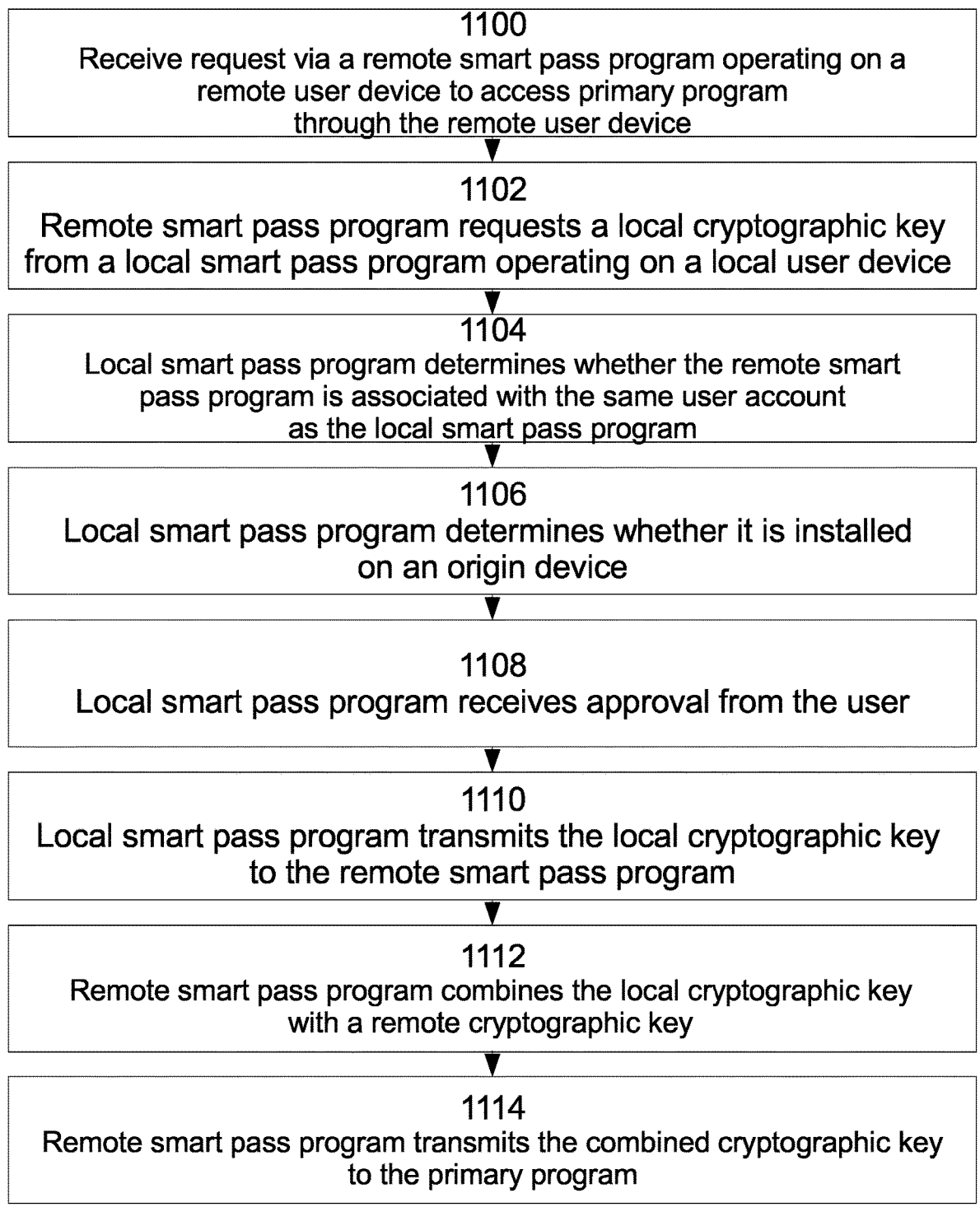
FIG. 11 is a flowchart showing an exemplary system process for securely obtaining access to a primary program on a remote device by requesting access from a remote smart pass program, with access secured via a remote smart pass program combining a remote key with a local key from a local smart pass program and transmitting the combined key.

FIG. 11 shows an exemplary system process. Upon receiving a request via a remote smart pass program operating on a remote user device to access a primary program through the remote user device 1100, the remote smart pass program may request a local cryptographic key from a local smart pass program, operating on a local user device, such as a phone 1102. The local smart pass program may first determine whether the remote smart pass program is associated with the same user as the local smart pass program 1104, then determine whether it is installed on an origin device 1106, and upon receiving approval from the user 1108, transmit to the local remote smart pass program a local cryptographic key dedicated to that primary program 1110. Then the remote smart pass program may then combine the cryptographic key from the local smart pass program with its own remote cryptographic key 1112. The remote smart pass program may then transmit the combined cryptographic key to the primary program 1114.

Figure 12:
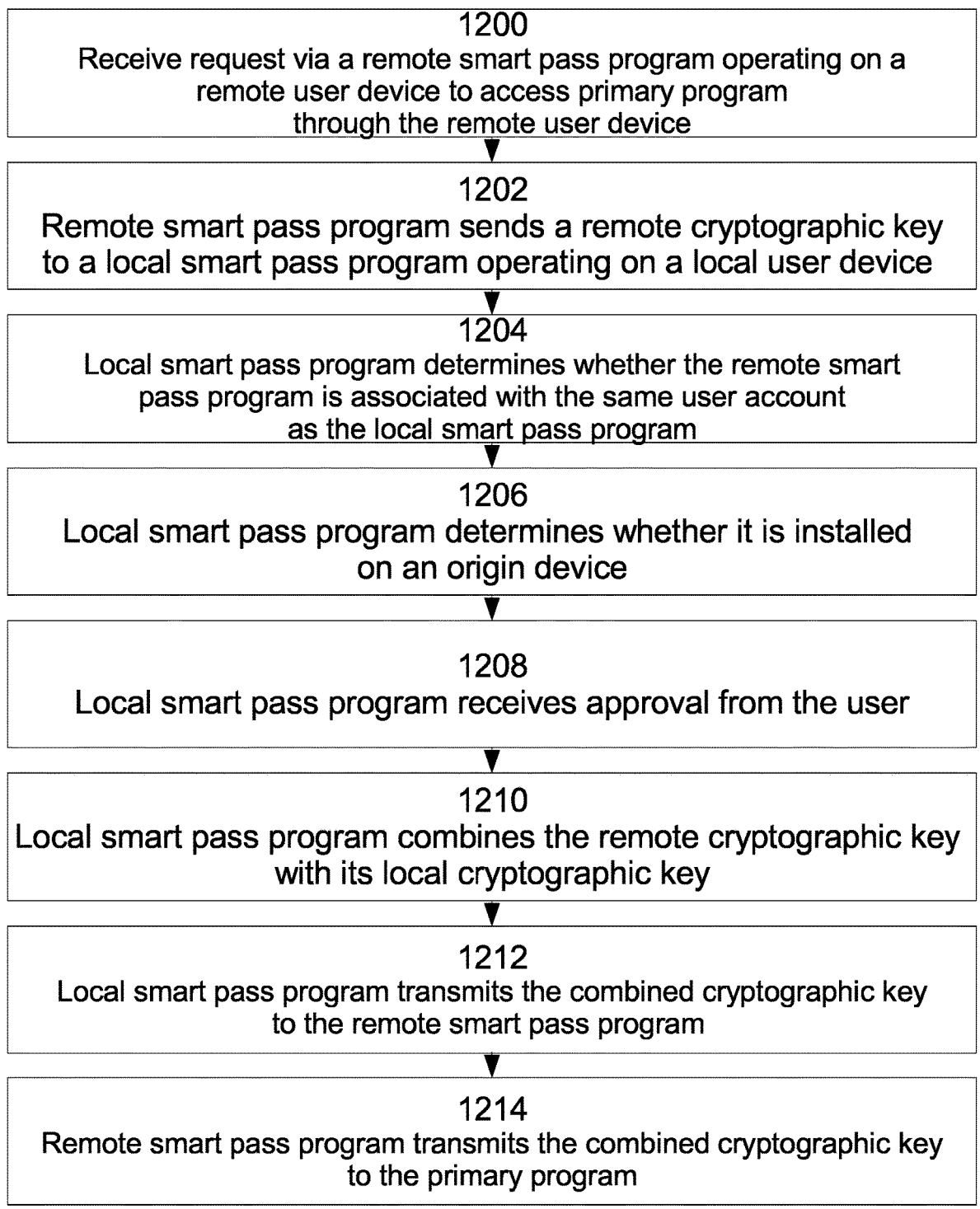
FIG. 12 is a flowchart showing an exemplary system process for securely obtaining access to a primary program on a remote device by requesting access from a remote smart pass program, with access secured via a local smart pass program combining a local key with a remote key from a remote smart pass program and transmitting the combined key.

FIG. 12 shows an exemplary system process. Upon receiving a request via a remote smart pass program operating on a remote user device to access a primary program through the remote user device 1200, the remote smart pass program may send a remote dedicated cryptographic key to the local smart pass program operating on a local user device 1202. The local smart pass program may first determine whether the remote smart pass program is associated with the same user as the local smart pass program or that the remote dedicated cryptographic key is authentic 1204, then determine whether it (the local smart pass program) is installed on an origin device 1206, and upon receiving approval from the user 1208, combine the remote dedicated cryptographic key with a first ("local") cryptographic key, 1210, with the local cryptographic key being created or managed by the local smart pass program, and then transmit to the remote smart pass program the combined cryptographic 1212. Then the remote smart pass program may then transmit the combined cryptographic key to the primary program 1214.

Figure 13:
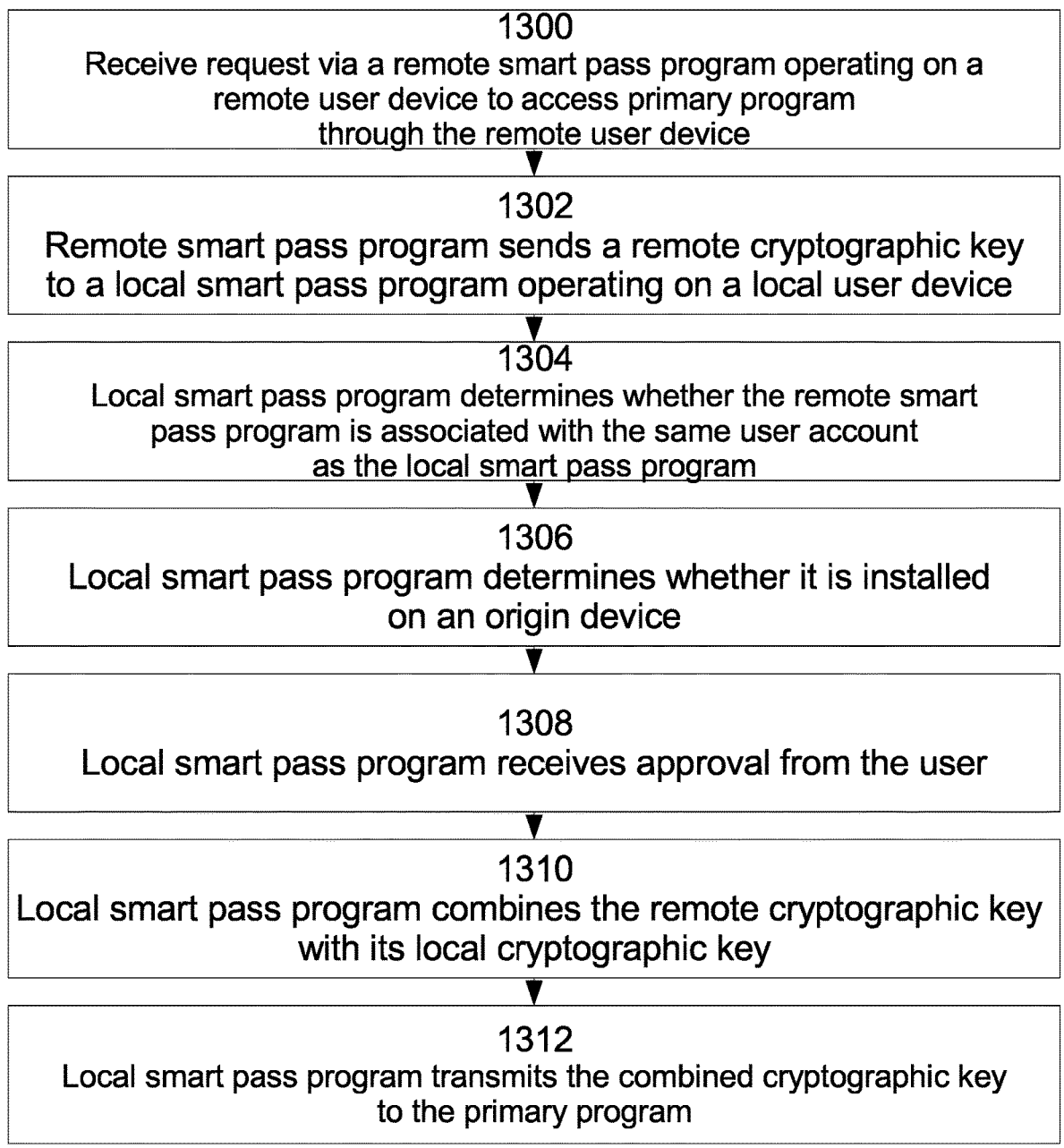
FIG. 13 is a flowchart showing an exemplary system process for securely obtaining access to a primary program on a remote device by requesting access from a remote smart pass program, with access secured via a local smart pass program combining a local key with a remote key from a remote smart pass program and transmitting the combined key.

FIG. 13 shows an exemplary system process. Upon receiving a request via a remote smart pass program operating on a remote user device to access a primary program through the remote user device 1300, the remote smart pass program may send a remote dedicated cryptographic key to the local smart pass program operating on a local user device 1302. The local smart pass program may first determine whether the remote smart pass program is associated with the same user as the local smart pass program or that the remote dedicated cryptographic key is authentic 1304, then determine whether it (the local smart pass program) is installed on an origin device 1306, and upon receiving approval from the user 1308, combine the remote dedicated cryptographic key with a local cryptographic key 1310, with the local cryptographic key being created or managed by the local smart pass program, and then transmit to the combined cryptographic key to the primary program 1312.

As variations, the system process described in FIGS. 2-13 can be modified such that instead of or in addition to recognizing the device as an origin device, the smart pass program may also confirm that the phone number associated with the user device was the origin number, the user account associated with the user device has been verified, the user account associated with the device is also associated with the user account on the primary program from which access is being requested, input data received by the user device on which the smart pass program is installed matches identification data associated with the user requesting access to the primary program (such as visual eye, fingerprint, and/or face data, username, password, and/or pin data).

In one embodiment, a local user operates a local user device and a remote user operates a remote user device. A local smart pass program may be installed on the local user device and a remote smart pass program may be installed on the remote user device. Both the local and remote user may have access to a common primary program, but the local user has a local user account and the remote user has a remote user account. Access to the local user account by the remote user may be predicated on transmission of a local cryptographic key by the remote pass program to the local pass program, either directly or via the common primary program. In one variation, the primary program is an electronic mail platform, and the remote user cannot send an email to the local user unless the remote user is able to transmit, via the remote smart pass program, the local cryptographic key. Thus, if the local user wishes to receive an email from the remote user, the local user must first transmit the local cryptographic key to the remote user.

In one variation of the above embodiment, cryptographic keys contain hashes that, when analyzed by a smart pass program, define the remote user's scope of access to the local user account permitted by the local smart pass program. Further, this scope can be defined by the local user. For example, if the local user intends to permit the remote user to send emails to the local user for a set period of time and/or for a set number of emails, that set period of time and/or set number of emails may be incorporated into the hash. In one variation, the hash may designate the remote user and the remote smart pass program, but not other users or other smart pass programs, and would therefore be unusable by any such other users or other smart pass programs.

The invention claimed is:

1. A system comprising a set of processors, a network, a first user device, a second user device, a set of input devices, a set of primary programs, a first smart pass program, and a second smart pass program;
   a. with each primary program being a software application, a browser, a website, or an online platform;
   b. with the first smart pass program installed on the first user device;
   c. with the second smart pass program installed on the second user device;
   d. with the first smart pass program configured to communicate with the second smart pass program;
   e. with each of the first and second smart pass programs configured to control a set of cryptographic keys, with each cryptographic key from among the set of cryptographic keys being dedicated to a unique primary program from among the set of primary programs;
   f. with the first smart pass program configured to recognize a first origin device, with the first origin device being a device on which the first smart pass program was initially installed;
   g. with the second smart pass program configured to recognize a second origin device, with the second origin device being a device on which the second smart program was initially installed;
   h. with the first smart pass program configured to, upon receiving a request from the second smart pass program for a given cryptographic key from among the set of cryptographic keys, transmit the given cryptographic key to the second smart pass program only if the first user device is the first origin device;
   i. with the second smart pass program configured to, upon receiving a request from a given primary program from among the set of primary programs for the given cryptographic key, transmit the given cryptographic key to the given primary program only if the second user device is the second origin device;
   j. with the given primary program configured to, upon receiving a request from the second user device to access the given primary program, provide access to a given feature of the given primary program only to the second user device upon receiving the given cryptographic key.

2. The system of claim 1, with the first smart pass program configured to transmit the given cryptographic key to the second user device only after matching input data received by the first user device to identification data stored on the first user device, with the identification data being at least in part:
   a. eye, fingerprint, or face data, or a user-created password or passcode.

3. The system of claim 1, with the second smart pass program configured to transmit the given cryptographic key to the given primary program only after matching input data received by the second user device to identification data stored on the second user device, with the identification data being at least in part:
   a. eye, fingerprint, or face data, or a user-created password or passcode.

4. The system of claim 1, with the first smart pass program configured to transmit the given cryptographic key to the given primary program only if the first smart pass program recognizes a user account on the first user device as a verified user account.

5. The system of claim 1, with the first smart pass program configured to transmit the given cryptographic key to the given primary program only if the first smart pass program recognizes a user account on the second user device as a verified user account.

6. The system of claim 1, with the first smart pass program configured to confirm that the first user device is the first origin device based on the detection of an origin phone number associated with the first user device, with origin phone number being a phone number associated with the first origin device.

7. The system of claim 1, with the second smart pass program configured to confirm that the first user device is the first origin device based on the detection of an origin phone number associated with the first user device, with origin phone number being a phone number associated with the first origin device.

8. The system of claim 1, with the second smart pass program configured to confirm that the first user device is the first origin device based on the detection of origin data stored on the first user device, with origin data being various data stored on the first origin device.

9. The system of claim 1, with the first smart pass program configured to transmit the given cryptographic key to the given primary program only after matching input data received by the first user device to identification data stored on the first user device.

10. The system of claim 9, with the identification data consisting of eye, fingerprint, or face data.

11. The system of claim 9, with the identification data being at least in part a combination of:
    eye, fingerprint, or face data, and
    a user-created password or passcode.

12. The system of claim 1, with each cryptographic key from among the set of cryptographic keys being a cryptographic algorithm.

13. The system of claim 1, with each cryptographic key from among the set of cryptographic keys consisting at least in part of matching input data.

14. The system of claim 1, with each cryptographic key from among the set of cryptographic keys consisting at least in part of origin data.

15. The system of claim 1, with the first user device configured to communicate with a sub-set of the set of primary programs across a network.

16. The system of claim 15, with the sub-set of the set of primary programs being installed on the first user device.

17. The system of claim 15, with the sub-set of the set of primary programs being installed on the second user device.

18. The system of claim 1, with the first user device being a smart phone, tablet, laptop, or desktop computer.

19. The system of claim 1, with the first user device being a smart phone and the second user device being a laptop or desktop computer.

\* \* \* \* \*